United States Patent [19]

McNair

[11] 4,054,086
[45] Oct. 18, 1977

[54] HOME DONUT MAKER

[75] Inventor: Samuel L. McNair, Kansas City, Mo.

[73] Assignee: Dazey Products Company, Kansas City, Mo.

[21] Appl. No.: 772,106

[22] Filed: Feb. 25, 1977

Related U.S. Application Data

[62] Division of Ser. No. 745,119, Nov. 26, 1976, abandoned.

[51] Int. Cl.² .............................................. A47J 37/00
[52] U.S. Cl. ........................................................ 99/374
[58] Field of Search .................. 99/345, 372, 373, 374,
99/426, 442, 487, 354, 384, 403, 424, 440, 450.6,
450.7, 450.8; 219/387, 521, 524, 525, 535;
425/98; 426/438, 439, 440

[56] References Cited

U.S. PATENT DOCUMENTS

| | | | |
|---|---|---|---|
| 1,587,788 | 6/1926 | Morley | 99/376 |
| 2,481,711 | 9/1949 | Bemis | 99/345 |

Primary Examiner—Leonard D. Christian
Assistant Examiner—Timothy F. Simone
Attorney, Agent, or Firm—Schmidt, Johnson, Hovey & Williams

[57] ABSTRACT

A donut maker for home use is disclosed which provides perfectly cooked and formed donuts having excellent taste and appearance characteristics notwithstanding the complete elimination of conventional deep fat frying of the donuts. The preferred device includes a base and openable lid section each having a pair of annular metallic concave walls disposed for cooperatively defining a pair of enclosed donut-shaped cooking chambers, along with a heating element for heating quantities of donut batter confined within the chambers; two corresponding sets of oil flow apertures are provided in the lid for allowing flow of cooking oil into the chambers during heating of the batter, in order to give the finished donut products a desirable crust and true donut flavor. In preferred donut-making procedures, cooking oil is introduced into the chamber during initial stages of cooking, whereupon the oil and cooking-generated steam are displaced from the chamber as the batter cooks and rises. During the final stages of cooking the oil is allowed to reenter the chamber through the apertures and be absorbed by the donuts, and this occurrence signals the end of the cooking cycle, so that perfectly cooked donuts are assured.

8 Claims, 10 Drawing Figures

HOME DONUT MAKER

This is a division of application Ser. No. 745,119 filed on Nov. 26, 1976, now abandoned.

This invention relates to a home donut maker and a method of cooking donuts which completely eliminates the need for deep fat frying of the donuts. More particularly, it is concerned with a home donut maker which provides perfectly formed donuts having true donut flavor true donut flavor by provision of structure presenting one or more annular metallic cooking chambers for donut-making batter, along with means for heating the batter causing the latter to rise. A prime feature of the invention involves the provision of a plurality of oil-conveying passages in the lid section of the device which allows cooking oil to be introduced into the cooking chamber during heating of the donut batter, in order to assure that the finished product will have the desirable organoleptic properties of donuts purchased commercially.

The conventional procedure for making a cake-type donut involves mixing a flour based batter and depositing quantities of this batter in annular form into a deep fat fryer by means of a specialized donut-making machine. The batter is then fried on each side for several minutes in order to completely cook the batter and provide a crust on the donuts, whereupon the cooked donuts are removed from the fryer. While in commercial operations in a donut shop or the like this procedure is feasible by virtue of the special equipment maintained for this purpose, it is obvious that this method of donut making is impractical in the home. Apart from the lack of a donut-making machine in the home, the deep frying step itself is extremely troublesome and can be dangerous. Furthermore, even when donut making of the conventional variety is attempted, it is simply not feasible to make the small number of donuts normally required for a single household. Accordingly, except in rare instances, cake-type donuts are purchased commercially.

A number of cooking devices have been proposed in the past for preparing specialized items in the home. See for example U.S. Pat. Nos. 2,314,872, 2,425,199, 3,115,104, 3,963,898, and D-231,069. In addition, U.S. Pat. No. 3,781,447 relates to a commercial apparatus for the production of annular skinless sausage products. However, none of these patents deal with a donut maker designed for home use.

It is therefore the most important object of the present invention to provide a home donut maker which is capable of producing any desired quantity of perfectly formed donuts having true donut flavor, with complete elimination of troublesome and time consuming deep fat frying of the donuts.

As a corollary to the foregoing, another object of the invention is to provide a home donut maker which includes a base section and an opposed, shiftable lid section each having a chamber-defining wall such that the walls cooperatively present a generally annular, substantially enclosed donut-cooking chamber, along with means for heating the defining walls of the chamber to cook the batter or other donut-making material received therewithin.

Another aim of the invention is to provide a home donut maker of the type described which further includes a plurality of oil-conveying apertures or passages in the lid section of the device for allowing introduction of cooking oil into the chamber during the cooking cycle, so that the finished donut product exhibits a true donut flavor and the proper crust and taste characteristics.

A still further object of the invention is to provide a method of cooking a donut or the like from an appropriate batter or dough which includes the steps of confining a quantity of the donut-making material within a substantially enclosed cooking chamber, followed by heating of the donut-making material within the chamber to cause the material to expand within the latter; in preferred forms, cooking oil is introduced into the chamber during cooking in a manner for assuring proper absorption of the oil into the dough or batter material in order to give a desirable end product having the taste and appearance characteristics of donuts purchased commercially.

A further aim of the invention is to provide a method of cooking a donut or other bakery item which includes the steps of placing a quantity of a dough or batter within a cooking chamber or zone, followed by heating and initial introduction of cooking oil into the zone and causing at least a portion of the oil to be displaced from the zone during the cooking step; the oil is then allowed to reenter the zone near the end of the cooking cycle in order to signal the end of the latter.

Figure 1:
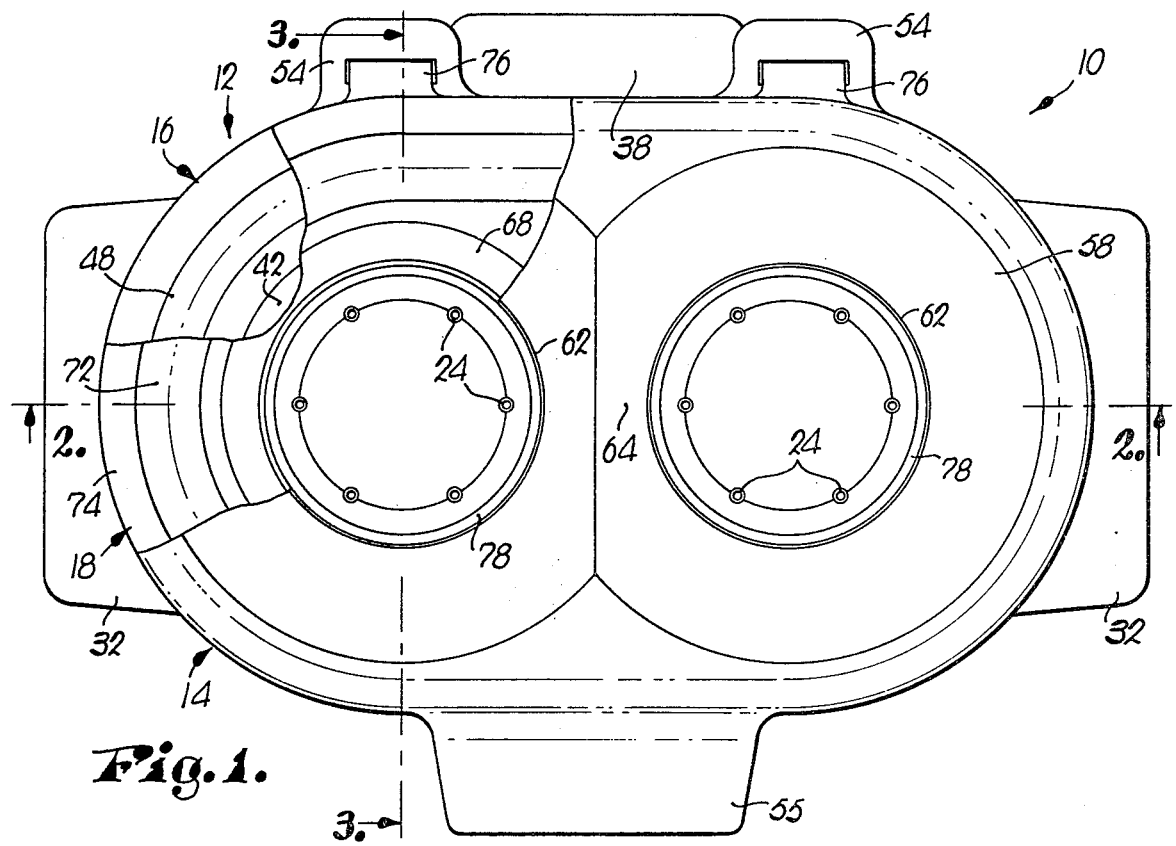
FIG. 1 is a plan view with parts broken away for clarity of a home donut maker in accordance with the invention.

Donut maker 10 broadly includes a base section 12 and an opposed, apertured, openable and removable lid section 14. The sections 12 and 14 include, respectively, metallic castings 16 and 18 which are designed to abut and cooperatively present a pair of generally annular, substantially enclosed cooking chambers 20 when the base and lid section are in their closed, adjacent donut-making position. Heating means 22 is also provided with donut maker 10 for the purpose of heating the defining walls of the cooking chambers 20 and thereby the donut-making material (such as a batter of dough) therewithin. Finally, the lid section 14 is provided with respective sets of apertures 24 which communicate with the individual chambers 20 for allowing cooking oil to flow into the latter, which is important for reasons to be explained hereinafter.

In more detail, base section 12 comprises a dish like synthetic resin element 26 having support pads 28 on the underside thereof and a continuous, circumscribing, upwardly extending sidewall 30. A pair of outwardly extending, side-mounted handles 32 are also provided with element 26, along with upstanding apertured mounting portions 34 for the casting 16. Finally, base section 12 also includes an outwardly projecting latch block 36 along the front thereof, and a rearwardly extending terminal block 38 along the rearward portion of wall 30.

Casting 16 is of integral construction and includes a generally planar upper wall portion 40, along with a pair of spaced, side-by-side, annular, concave chamber-defining wall portions 42. A depending annular post section 44 is provided at the center of each wall portion 42 (see FIGS. 2 and 3), and is internally threaded. The upper surface of each section 44 is generally planar as at 46.

Figure 2:
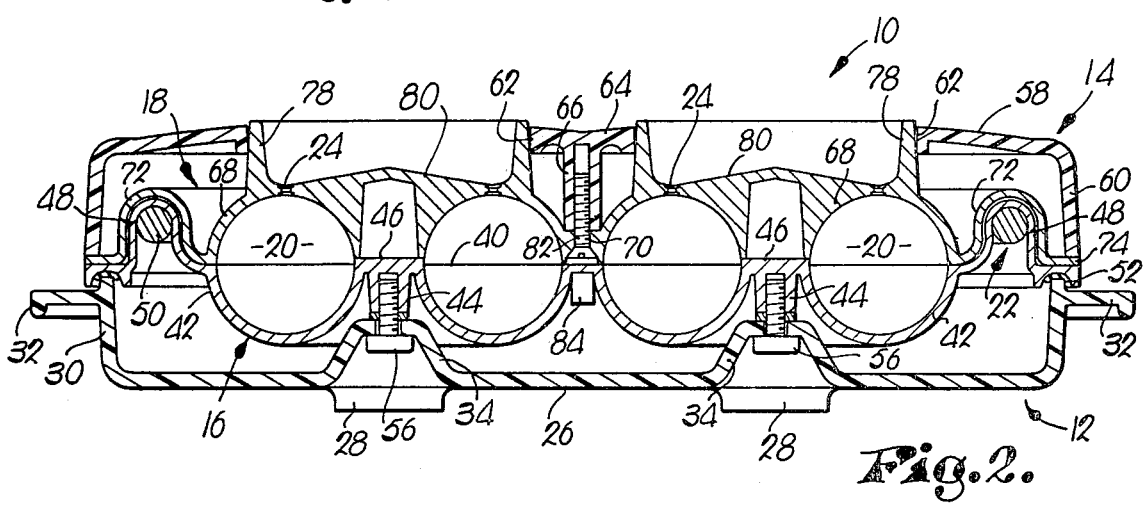
FIG. 2 is a vertical sectional view taken along line 2—2 of FIG. 1 and illustrating the internal construction of the donut maker.
Figure 3:
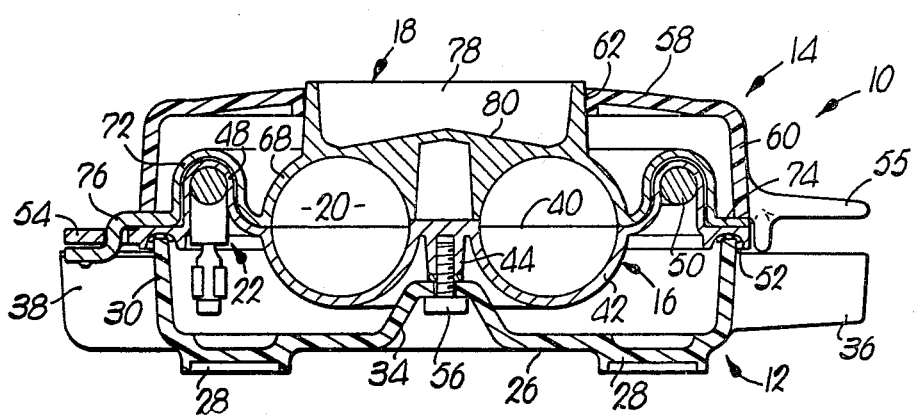
FIG. 3 is a vertical sectional view taken along line 3—3 of FIG. 1 and further depicting the internal construction of the donut maker.
Figure 4:
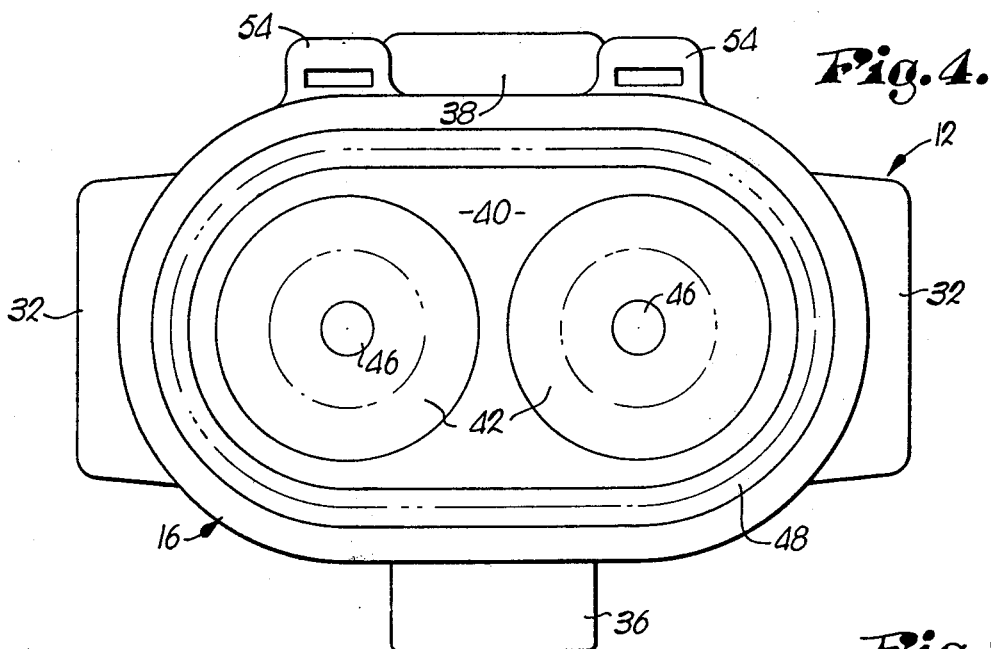
FIG. 4 is a plan view of the base section of the donut maker, with the lid thereof removed.
Figure 5:
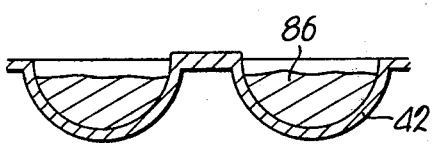
FIGS. 5–10 are essentially schematic representations of the preferred method steps to be followed in producing cake-type donuts using the donut maker hereof.
Figure 8:
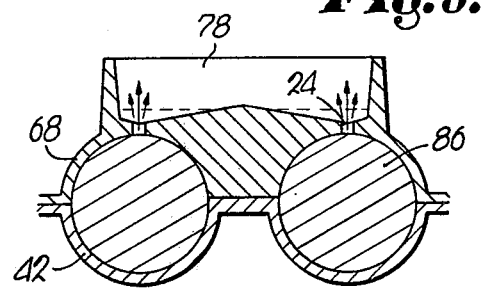
Figure 6:
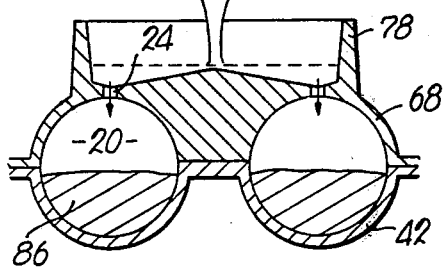
Figure 9:
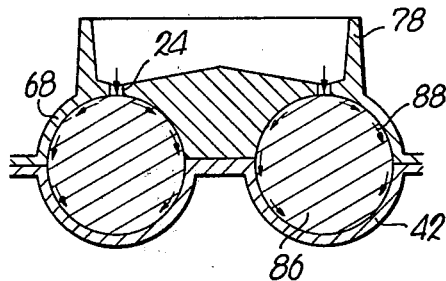
Figure 7:
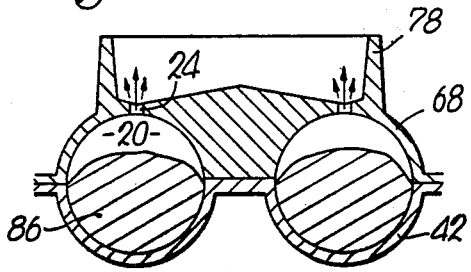
Figure 10:
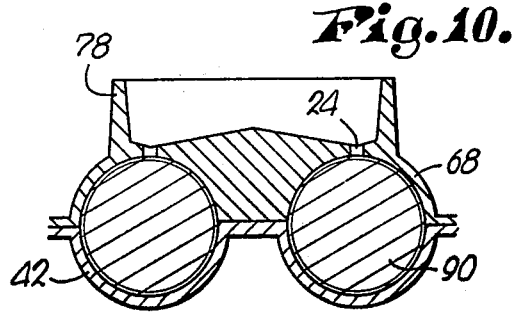

Casting 16 also includes an upwardly projecting, arcuate, continuous, oblong wall portion 48 which is constructed for receiving a circumscribing heating element 50. The periphery of casting 16 is in the form of a continuous, downwardly opening groove 52 which is adapted to receive the uppermost end of sidewall 30 as best shown in FIGS. 2 and 3. Finally, a pair of rearwardly extending, slotted hinge projections 54 are provided along the rearward surface of casting 16 for allowing removable mounting of lid section 14 to the base section 12.

A pair of connection screws 56 are employed for interconnecting element 26 and casting 16. Referring specifically to FIGS. 2 and 3, it will be seen that the screws 56 are threaded upwardly through the mated apertures in the mounting portions 34 and post sections 44, in order to couple element 26 and casting 16 as a subassembly.

Lid section 14 is likewise of two piece construction and includes an upper synthetic resin element 58 having an apertured top wall and a depending, substantially continuous sidewall 60. A pair of side-by-side, spaced, relatively large openings 62 are provided in the top wall of element 58, and the central area 64 thereof is provided with a depending, annular, internally threaded connecting projection 66.

Casting 18 is similar in many respects to casting 16 and includes a pair of separate, spaced, side-by-side chamber-defining wall portions 68 of annular, concave, continuous construction. The central portion of casting 18 is apertured as at 70 to allow interconnection of casting 18 and element 58. In addition, casting 18 includes an upwardly extending, peripheral, continuous, oblong wall portion 72 which is constructed to complementally fit over and substantially engage wall portion 48 of casting 16 along the entire extent of the latter. As best seen in FIGS. 2 and 3, a peripheral, outwardly extending lip 74 forms the outer edge of casting 18, and lip 74 is adapted to engage the lowermost surface of sidewall 60. Casting 16 is also provided with a pair of spaced, irregularly shaped hinge projections 76 which extend from the rear surface thereof and are adapted to interengage with the slots in the respective projections 54. In this manner, lid portion 14 can be moved from the closed position illustrated in FIGS. 2 and 3 to an open position allowing access to the interior of the donut maker. Finally, a forwardly projecting latch member 55 is included for abutting block 36; latch means (not shown) are also provided for interconnecting the lid and base sections during donut-cooking operations.

Casting 18 is also provided with a pair of spaced upright oil-confining walls 78 of circular configuration which are located above and project upwardly from the top of the respective chamber-defining wall portions 68. The surfaces of casting 18 within the respective walls 78 are downwardly tapered as at 80 to facilitate oil flow towards the outermost portions of the areas defined by the walls 78.

A plurality of circularly arranged, equidistantly spaced oil flow apertures 24 are provided through the respective wall portions 68 in locations for communicating with the chambers 20 and allowing oil flow thereinto. in this connection it will be seen that the apertures 24 are located adjacent the walls 78 so that oil confined within the latter is directed through the apertures.

Element 58 and casting 18 are interconnected simply by locating the former so that the openings 62 thereof receive the respective upstanding walls 78 and the aperture 70 and the aperture of projection 66 are aligned. A screw 82 is employed for coupling element 58 and casting 18 and to present a subassembly separable from base section 12.

Heating means 22 includes the heating element 50 described above in addition to a conventional thermostat 84 used for temperature control. In addition, conventional means (not shown) are provided for supplying electric power to the resistance heating element 50; in the usual fashion, this would include an electric cord extending through block 38 and operatively coupled to thermostat 84 and element 50.

Referring again to FIGS. 2 and 3, it will be seen that when base section 12 and lid section 14 are placed in opposed, adjacent relationship, a pair of generally annular, continuous, substantially enclosed cooking chambers 20 are defined by the respective abutting wall portions 42 and 68. However, lid section 14 can be selectively raised (or removed from base section 12) by lifting section 14 using latch member 55, for allowing introduction of donut-making batter or dough into the device, and to permit removal of cooked donuts therefrom.

The preferred donut-making procedure in accordance with the invention is schematically illustrated in FIGS. 5–10. The first step involves lifting lid section 14 and depositing a quantity of donut-making material 86 (such as a batter or the like) into the concavities presented by the respective wall portions 42. At this point lid section 14 is closed to present the substantially enclosed cooking chambers 20, whereupon the heating cycle is commenced through actuation of heating element 50. This in turn causes the material 84 to begin to rise within the chambers 20.

After about 1 minute's heating time, a small quantity of cooking oil (such as about three quarters of a teaspoon) is deposited in each oil-confining space above the chambers, and this oil flows (see FIG. 6) through the apertures 24 into the underlying chambers 20. The circular arrangement of the apertures 24 assures that the oil is evenly distributed throughout the chambers 20.

As heating and cooking of the material 86 continues, the latter rises and generates steam. This steam, along with a substantial portion of the oil originally introduced into the chambers 20, is displaced back through the apertures 24 (see FIG. 7) by a "sputtering" action. This oil and steam displacement and "sputtering" is allowed to continue for several minutes as cooking proceeds. At this same time, the donut making material continues to rise and fill the annular chambers 24.

During the final stages of cooking, the displaced oil again reenters the chambers 20 through the apertures 24, and is absorbed by the now substantially cooked donuts therewithin. This absorption action is schematically illustrated by the arrows 88, and is believed to occur substantially in the crust of the donuts. In any event, this reentry of the oil into the chambers 20 signals the end of the cooking cycle, and, after a few moments final cooking, heating is discontinued. At this point lid section 14 can again be raised, and the cooked donuts 90 (see FIG. 10) removed from the maker 10. As is apparent from FIGS. 9 and 10, the finished donuts assume the annular shape of the chambers 20, and are therefore essentially uniform and perfect in configuration.

A prime feature of the described cooking process involves the introduction of cooking oil into the chambers 20 during the cooking cycle. This has been found to materially enhance formation of a desirable crust on the finished products; moreover, products made without the addition of cooking oil are in general less desirable and often exhibit the taste characteristics of a cupcake, rather than a donut.

Another advantage of the cooking procedure hereof stems from the essentially automatic timing afforded by the displacement and reentry of the cooking oil. That is, the cooking cycle need not be precisely timed by the user, since it is only necessary to watch the oil level within the spaces defined by the walls 78. When sputtering of this oil has substantially ceased, and the oil reenters the chambers 20 through the apertures 24, the user knows that the cooking cycle is substantially complete. This timing function is obtained without any special care or precautions on the part of the user, and is therefore highly advantageous.

It will also be appreciated that numerous alterations can be made in the described device without departing from the spirit and scope of the invention. For example, any convenient number of donut-cooking chambers (such as one, two or four) can be provided, along with other specific type of heating means.

Having thus described the invention, what is claimed as new and desired to be secured by Letters Patent is:

1. A cooking device, comprising:
   a base section including a metallic, nonporous, first concave wall adapted to hold a quantity of batter or the like to be cooked;
   a lid section including a metallic, nonporous, second wall,
   said lid section being shiftable with respect to said base section for movement thereof between a closed cooking position where said lid section and said base section are adjacent and said first and second walls are proximally disposed for cooperatively presenting a substantially enclosed cooking chamber, to an open position where the base and lid sections are spread apart;
   means for electrically heating at least one of said first and second walls;
   means on said lid section defining a cavity for collecting cooking oil; and
   structure defining at least one unobstructed aperture through said second wall for establishing continuous communication between said cavity and cooking chamber when said sections are adjacently disposed, and for allowing flow of cooking oil into said chamber from said cavity, flow of oil and steam from said chamber to said cavity as said batter expands, and subsequent return of said oil to said chamber, during final cooking of said batter or the like.

2. The cooking device as set forth in claim 1 wherein said base and lid sections each include separate chamber-defining walls cooperatively presenting a plurality of individual cooking chambers.

3. The cooking device as set forth in claim 1 wherein said first and second walls are of annular configuration for cooperatively defining an annular cooking chamber.

4. The cooking device as set forth in claim 1 wherein said electrical heating means includes an electrical heating element disposed adjacent said chamber-defining walls and in operative, wall-heating disposition to each of the same.

5. The cooking device as set forth in claim 4 including a thermostat for controlling the heating of said chamber-defining walls.

6. The cooking device as set forth in claim 1 wherein said aperture-defining structure includes walls defining a plurality of circularly arranged oil flow apertures extending through said second wall.

7. The cooking device as set forth in claim 6 wherein said cavity-defining means includes an upstanding cooking oil-confining structure in surrounding relationship to said oil flow apertures.

8. The cooking device as set forth in claim 1 wherein said cavity is in communication with the atmosphere for venting of steam therefrom.

* * * * *